United States Patent [19]

Minich et al.

[11] Patent Number: 5,510,861

[45] Date of Patent: Apr. 23, 1996

[54] COMPACT PROJECTOR AND METHOD OF USING SAME

[75] Inventors: Arthur P. Minich; David W. Kappel, both of San Diego, Calif.

[73] Assignee: Proxima Corporation, San Diego, Calif.

[21] Appl. No.: 306,366

[22] Filed: Sep. 15, 1994

Related U.S. Application Data

[63] Continuation-in-part of Ser. No. 260,709, Jun. 16, 1994, abandoned, Ser. No. 123,133, Sep. 17, 1993, and Ser. No. 122,697, Sep. 17, 1993, Pat. No. 5,400,095, said Ser. No. 123,133, and Ser. No. 122,697, each is a continuation-in-part of Ser. No.59,550, May 11, 1993, Pat. No. 5,321,450.

[51] Int. Cl.$^6$ .................................................. G03B 21/28
[52] U.S. Cl. .............................. 353/119; 353/38; 353/99
[58] Field of Search ........................ 353/119, 37, 38, 353/63, 64, 98, 99, DIG. 3; 359/40, 48, 49; 362/297, 298, 343

[56] References Cited

U.S. PATENT DOCUMENTS

| | | | |
|---|---|---|---|
| 4,737,896 | 4/1988 | Mochizuki et al. | 359/48 |
| 5,296,882 | 3/1994 | Nelson et al. | 353/38 |
| 5,379,080 | 1/1995 | Ouozuka | 353/38 |
| 5,396,350 | 3/1995 | Beeson et al. | 359/40 |

FOREIGN PATENT DOCUMENTS

| | | | |
|---|---|---|---|
| 2820537 | 11/1979 | Germany | 353/119 |
| 0060934 | 5/1980 | Japan | 353/DIG. 3 |

*Primary Examiner*—William C. Dowling
*Attorney, Agent, or Firm*—Bernard L. Kleinke; Jerry R. Potts; Peter P. Scott

[57] ABSTRACT

A compact projection illumination system includes a display controller, a condenser lens assembly including a light source, and a pair of finely faceted mirrors angularly disposed relative to one another to spread projection light emitted from the high intensity projection light source in two directions, and direct the reflected light to an image forming display device where an image is formed for projection purposes. The light is spread to illuminate precisely the light impinging surface of the image forming display device. To reduce image distortion caused by the faceted mirrors forming beam segments, the condenser lens assembly and the light source are arranged and constructed to permit the reflected beam segments to converge sufficiently to fill in dark or shadow areas between the beam segments prior to the segments impinging on the image forming display device, so that the resulting image is formed uniformly and substantially distortion free in a narrowly defined, compact space.

10 Claims, 6 Drawing Sheets

COMPACT PROJECTOR AND METHOD OF USING SAME

CROSS-REFERENCE TO RELATED APPLICATIONS

This patent application is a continuation-in-part patent application of U.S. patent application Ser. No. 08/260,709 filed Jun. 16, 1994, and now abandoned, entitled "FULL COLOR IMAGE FORMING APPARATUS AND METHOD OF USING SAME," and of U.S. patent application Ser. No. 08/123,133 filed Sep. 17, 1993, still pending, entitled "PROJECTION LENS AND METHOD OF USING SAME," and of U.S. patent application Ser. No. 08/122,697 filed Sep. 17, 1993, now U.S. Pat. No. 5,400,095, entitled "DISPLAY PROJECTION METHOD AND APPARATUS AND OPTICAL INPUT DEVICE THEREFOR." U.S. patent applications Ser. No. 08/123,133 and Ser. No. 08/122,697 are continuations-in-part of U.S. patent application Ser. No. 08/059,550 filed May 11, 1993, now U.S. Pat. No. 5,321,450 issued Jun. 14, 1994, entitled "LOW PROFILE LIQUID CRYSTAL PROJECTOR AND METHOD OF USING SAME." The foregoing patent applications and patents are incorporated herein by reference.

The following patent applications are incorporated herein by reference: U.S. patent application Ser. No. 08/247,720, filed May 23, 1994, entitled "METHOD AND DISPLAY CONTROL SYSTEM FOR ACCENTUATING"; which is a continuation-in-part of both U.S. patent application Ser. No. 08/237,013, filed Apr. 29, 1994, entitled "DISPLAY CONTROL SYSTEM AND METHOD OF USING SAME," and U.S. patent application Ser. No. 08/235,292 filed Apr. 29, 1994, entitled "METHOD AND DISPLAY CONTROL SYSTEM FOR PANNING."

TECHNICAL FIELD

The present invention relates to a projection illumination system and illumination methods therefor. It more particularly relates to an improved compact liquid crystal projector system, which is relatively small in size and thus able to be readily transported.

BACKGROUND OF THE INVENTION

Overhead projectors for large audience presentations are well known in the prior art. Such systems typically utilize transparencies for conveying the information to be viewed by the audience.

With advances in modern liquid crystal technology, such transparencies have been replaced by full color liquid crystal display panels driven by video signal producing equipment, such as personal computers. In this regard, the liquid crystal display panel is typically positioned on the stage of an overhead projector to project an image onto a remote viewing surface.

While the above described projection system has proven to be highly successful, it would be desirable, for some applications, to eliminate the need for the separate overhead projector. Such a projector is not readily transportable by a business or other person who desires to travel from place to place for making sales or other types of presentations or the like.

Therefore, it would be highly desirable to have a new and improved compact projector, which is small in size and readily transportable, and yet is able to project video images, such as computer generated images.

In order to have such a transportable projection system, an integrated compact projection system has been employed and has been proven to be highly successful. The integrated system includes a computer driven display panel built into a small, low profile projector. Such an integrated projector is disclosed in the foregoing mentioned patent and patent applications.

Such an integrated compact projector is so small and compact that it can be readily carried, for example, onto an airplane. In this manner, an entire display presentation can be pre-programmed and stored in a small personal computer, and the projector can be readily transported therewith. Thus, a person can conveniently travel with the presentation equipment, for use when traveling.

While such a projector has proven to be overwhelmingly successful, it would be desirable to have a projector housing, which is even smaller in size, for a given size light source contained therewithin. The light source illuminating the image forming area produces diverging light, which requires by necessity a sufficiently large housing. If the light were somehow confined in a more limited space, the housing could, therefore, be decreased in size accordingly.

One attempt at addressing this problem included a technique used in a projection system for confining the light illuminating a display panel. For example, a display projection system is disclosed in U.S. Pat. No. 5,272,473 and 5,287,096, which are both incorporated herein by reference. Both patents teach the utilization of two angularly disposed serrated devices, referred to in the patent as "lenses," to confine light emitted from an image forming device, and to direct the light to a remotely located viewing surface. The configuration of serrated devices does apparently accomplish the desired effect of confining the light to the precise dimensions of a viewing surface, but there are several significant problems related to the use of such a technique. Firstly, the light image can become distorted as a result of the serrated devices producing a plurality of smaller light beams. While the serrated devices tend to expand the light image in both the horizontal and vertical dimensions, the stepped surfaces produce the smaller beams are spaced apart, thereby distorting the image. Moreover, since there are two serrated devices, the distortion is compounded.

As a consequence of such inherent distortion, the patented system employs a highly dispersive viewing surface, such as one having ground glass to blur the smaller beams together.

Therefore, it would be highly desirable to have a compact projection technique, which precisely controls the projection light without substantial image distortion.

DISCLOSURE OF INVENTION

Therefore, the principal object of the present invention is to provide a new and improved precisely controlled projection apparatus and method with little or no image distortion.

Another object of the present invention is to provide such a new and improved projection apparatus and method to facilitate the provision of a compact size projector.

Briefly, the above and further objects of the present invention are realized by providing a new and improved projector technique, to project a light image with a precisely controlled projection light with little or no image distortion.

A projector includes a pair of finely faceted mirrors angularly disposed relative to one another to spread projection light emitted from a high intensity projection light source in two directions, and direct the reflected light to an image forming display device where an image is formed for projection purposes. The light is spread to illuminate precisely the light impinging surface of the image forming display device in a compact and efficient manner. To reduce image distortion caused by the light source beam segments, the light source and optic elements including the mirrors are arranged and constructed to permit the beam segments to converge sufficiently to fill in dark or shadow areas between the beam segments prior to the segments impinging on the image forming display device, so that the resulting image is formed uniformly and substantially distortion free in a narrowly defined, compact space.

It should be understood that the projection illumination arrangement of the present invention can be used in a projector having an integrated liquid crystal display as the image forming display device, and in an overhead projector having a transparency supporting transparent stage as the image forming device.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
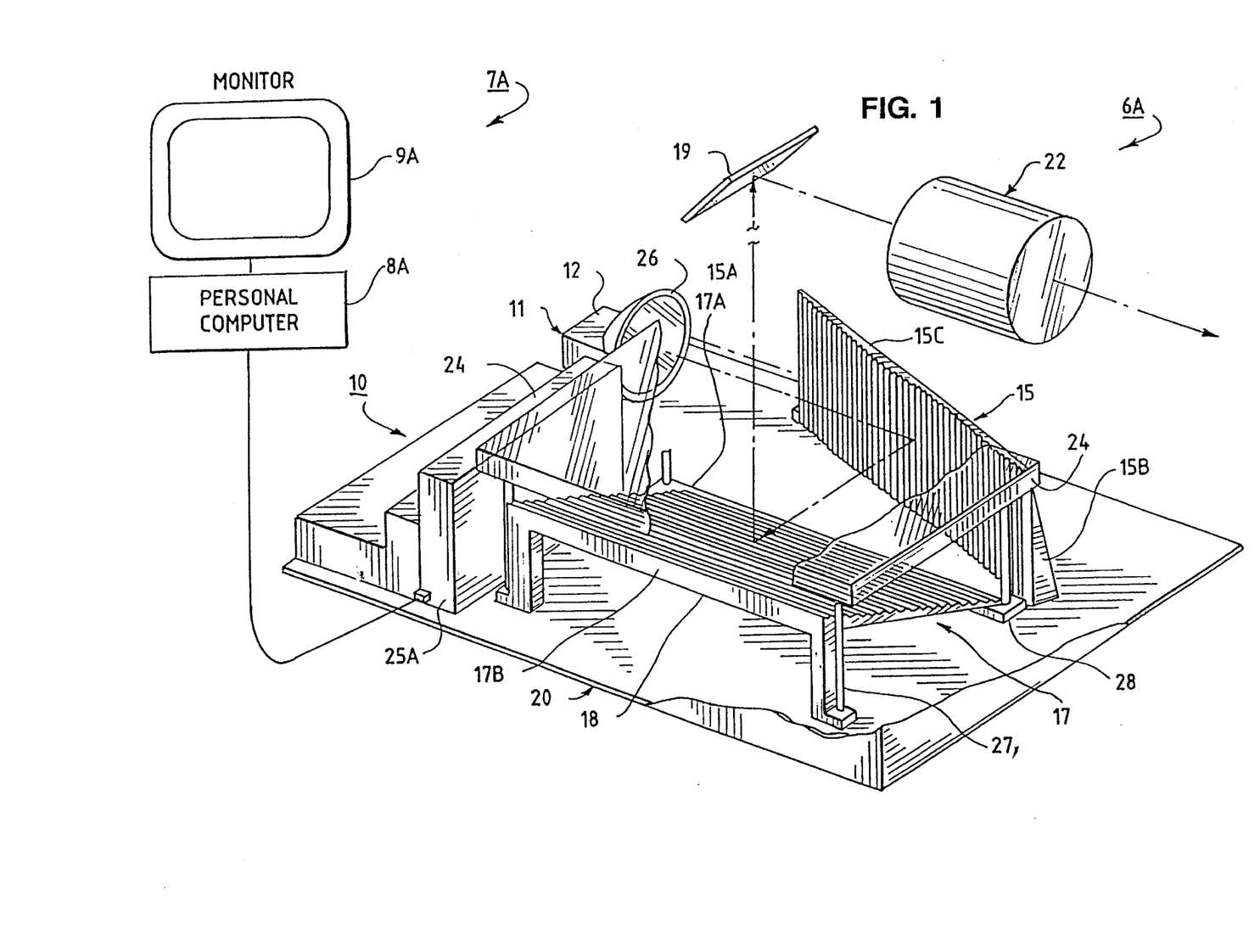
FIG. 1 is a pictorial diagrammatic, partially broken away view of an integrated projector, which is constructed in accordance with the present invention.

Referring now to the drawings, and more particularly to FIG. 1, there is shown a projection illumination system 6 which is constructed in accordance with the present invention, and which is illustrated connected to a video signal producing system 7 including a personal computer 8 and monitor 9. The system 6 is adapted to project computer generated images onto remotely located viewing surfaces (not shown).

Figure 2:
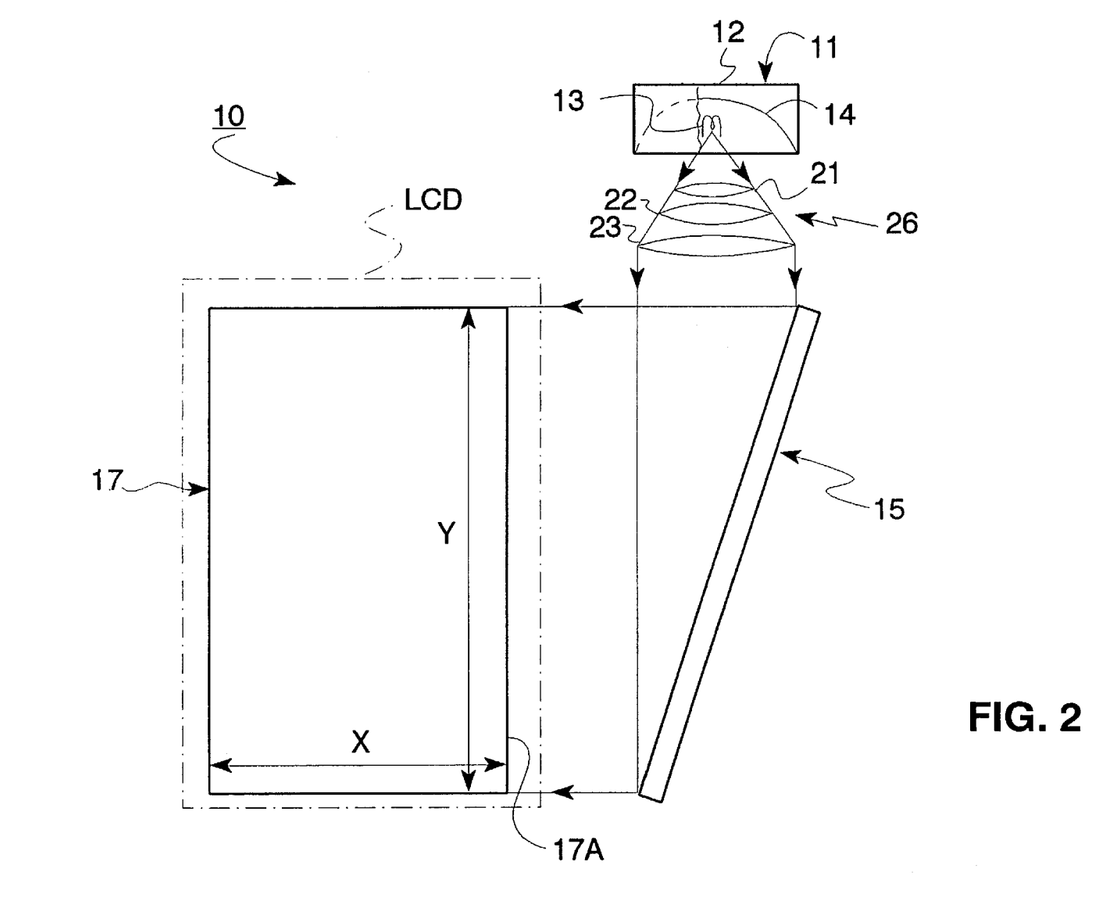
FIG. 2 is a top plan diagrammatic view of the projector of FIG. 1.

The system 6 generally includes an integrated projector 10 having a base portion or housing 20, confining a projection lamp assembly 11 including a high intensity lamp 13 (as shown in FIG. 2) and a condenser lens assembly 26, together with a pair of spaced-apart finely faceted mirrors 15 and 17 for directing the light from the assembly 11 onto a lower light impinging surface of a horizontal liquid crystal display 24, which serves as an image forming display device. Disposed above the liquid crystal display 24 is a top output mirror assembly 19, and a projection lens system or assembly 22, for facilitating the projection of an image onto a remote viewing surface (not shown). This is just one possible orientation of the lens assembly 22. Other orientations are possible, such as a vertically directed orientation.

In order to cause the display panel 24 to modulate the light from the mirrors 15 and 17, a display control system 25 responsive to the personal computer 8, sends control signals to the display 24. The display control system 25 includes various control logic for compressing, panning, zooming and controlling the system images.

The liquid crystal panel 24 is supported by four legs, such as the leg 27, enabling the housing 20 to have a low profile and thus be more compact. The liquid crystal display panel 24 is more fully described in U.S. patent application Ser. No. 08/237,013, filed Apr. 29, 1994, which is incorporated herein by reference. Also, it will become apparent to those skilled in the art that there are many different transmissive and reflective spatial modulators or light valves which may be used in place of the liquid crystal display 24.

The lamp assembly 11 including the condenser lens assembly 26 is mounted at a rear portion of the housing 20 and provides a source of high intensity projection light for passing through the liquid crystal display panel 24. The finely faceted mirrors, which will be described hereinafter in greater detail, form part of the inventive projection illumination arrangement for directing light from the condenser lens assembly 26, through the liquid crystal display panel 24, to the top output mirror assembly 19 for projection via the lens assembly 22. In this regard, the faceted mirror arrangement directs the horizontal, forwardly directed high intensity light within the housing 20 along an irregularly shaped light path extending from the mirror 15 perpendicularly to the mirror 17 and then upwardly through the liquid crystal display panel 24.

In operation, the projector 10 is positioned on a stationary surface, such as a table top (not shown) with a front portion of the housing disposed closest to the remotely located surface to receive the projected image. The personal computer 8, is coupled electrically to the display panel 24 via the display control system 25 for enabling computer generated images to be formed by the display panel 24.

Light from the condenser lens assembly 26 is directed by the faceted mirror arrangement along the irregularly shaped light path which extends from the condenser lens assembly 26 to the mirror 15 and perpendicularly therefrom to the mirror 17. From there, the light is reflected vertically upwardly to the low light impinging surface of the liquid crystal display panel 24 to form the desired image. The top output mirror assembly 19 and the projection lens assembly 22, projects reflectively the light image formed by the display panel 24 onto a viewing surface (not shown).

To effectively greatly reduce or eliminate image distortion, and to provide a precisely expanded light beam, the faceted mirror arrangement is disposed between the light source and the display panel, and the mirrors are constructed and arranged to reduce image distortion. By arranging the mirrors 15 and 17 in this manner, the projection light from the condenser lens assembly 26 can be precisely directed onto the light impinging surface of the display panel 24 by adjusting its shape in both the X and Y dimensions as hereinafter described in greater detail. Thus, the light is confined in a compact space to reduce the overall size of the housing 20.

In order to accomplish the precise directing of the light, the faceted mirrors spread the light into a set of beam segments to form an overall beam of a generally rectangular cross-sectional configuration, which is generally similar to the size of the face of the display panel 24. For the purpose of filling in any blank or dark spaces between adjacent beam segments, as hereinafter described in greater detail, the mirror 15 is spaced sufficiently from the mirror 17, which, in turn, is spaced sufficiently from the display panel 24 to permit the beam segments to diverge sufficiently to uniformly cover the bottom face of the display panel 24 with little or no dark or shadow areas. Thus, the image is then formed by the display panel 24 in a substantially undistorted manner within a compact space.

Considering now the lamp assembly 11 including the condenser lens assembly 26 in greater detail with reference to FIGS. 1 and 2, the assembly 11 generally includes a lamp housing unit 12 which is mounted at the rear portion of the housing 20. The lamp housing unit 12 includes a high intensity lamp 13 (FIG. 2) and a spherical reflector 14, both of which direct the light generated thereby to the condenser lens assembly 26, which includes condenser lens elements 21, 22 and 23, for directing the light toward the first faceted mirror 15. The three lens elements are nested and curved, and are progressively larger in size as they are positioned further from the lamp 13. It should be understood that other types and kinds of lamps may also be employed.

The lamp housing unit 12 provides a means for mounting the condenser lens assembly 26 at a predetermined distance from the lamp 13. As indicated in FIG. 2, light rays generated by the lamp 13 travel in a generally parallel manner to the faceted mirror 15 in a direction perpendicular to the surface of the condenser lens assembly 26. However, as hereinafter described in greater detail, as a practical matter, the light is spread and is not entirely parallel as indicated in FIG. 2. This fact is compensated for according to the present invention.

Figure 3:
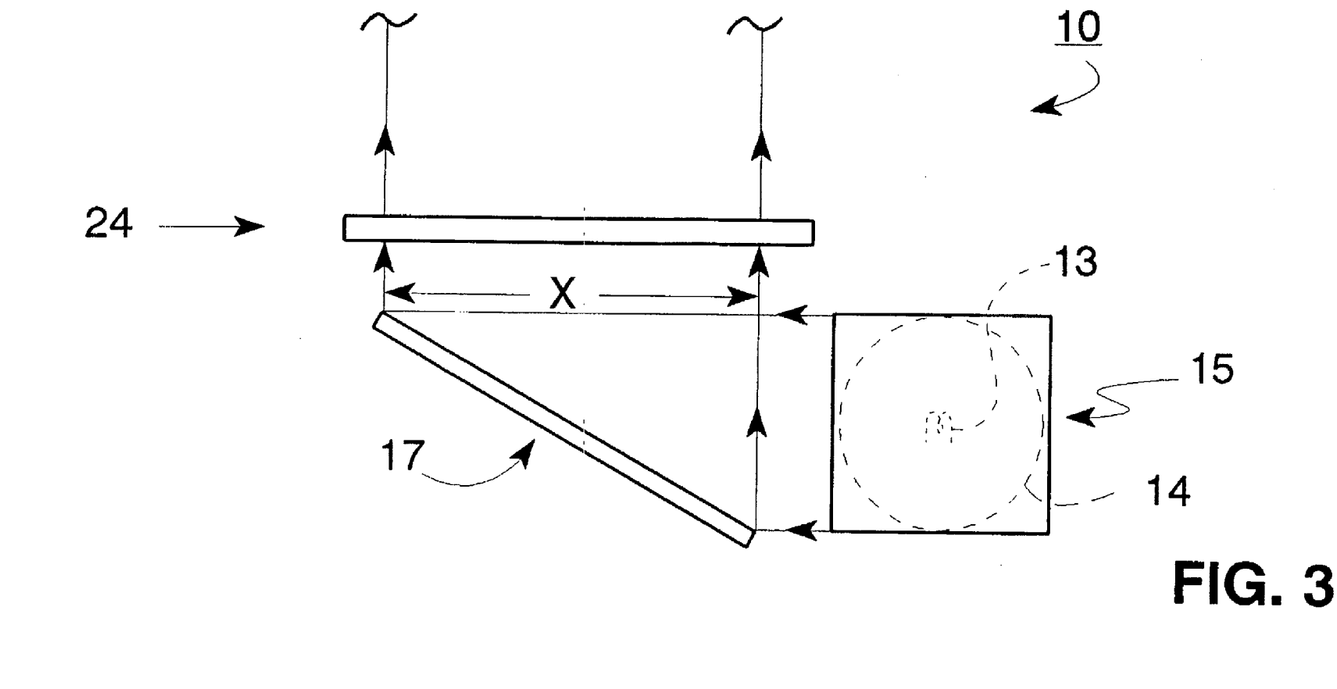
FIG. 3 is a front elevational, diagrammatic view of the projector of FIG. 1.

Considering now the faceted mirror arrangement in greater detail with reference to FIGS. 1–3, the faceted mirrors 15 and 17 are angularly spaced apart in close proximity to one another. The mirror 15 is vertically disposed and is positioned with its light impinging face at an angle to the horizontal collimated light emitted from the lamp 13 to reflect such light perpendicularly horizontally toward the mirror 17.

The faceted mirror 17 is inclined backwardly at an angle and is supported at its upper edge 17B by a U-shaped support frame 18. The mirror 17 is supported at its lower edge 17A by an elongated support bracket 28 mounted on the housing 20. The mirror 17 is positioned at a sufficient angle to reflect the incident horizontal beam perpendicularly vertically upwardly toward the bottom face of the horizontal display panel 24 for illuminating it.

The faceted mirrors 15 and 17 have sufficiently finely spaced facets for segmenting the light being reflected from their surfaces. The resulting spaced-apart light beam segments are sufficiently closely spaced to cause them to diverge and fill in any dark or shadow spaces therebetween, before they impinge upon the adjacent surface. As hereinafter described in greater detail, this result is dependent on various factors, including the redirecting of light beams from the light source, the size of the light source, and the effective focal length of the condenser lens assembly 26, for a given configuration of the angle of the mirror facets, the spacing of the individual facets, and the distance between each mirror and its adjacent component, such as the distance between the mirrors 15 and 17, and the distance between the mirror 17 and the display panel 24.

The mirrors 15 and 17 are each similar to one another, and thus only the mirror 15 will now be described in greater detail. The vertical mirror 15 includes a tapered back plate 15B having on its face a series of angularly disposed facets, such as the facets 29 and 30 (FIG. 1) projecting angularly outwardly therefrom. The facets extend vertically between the bottom edge 15A and a top edge 15C.

Figure 4:
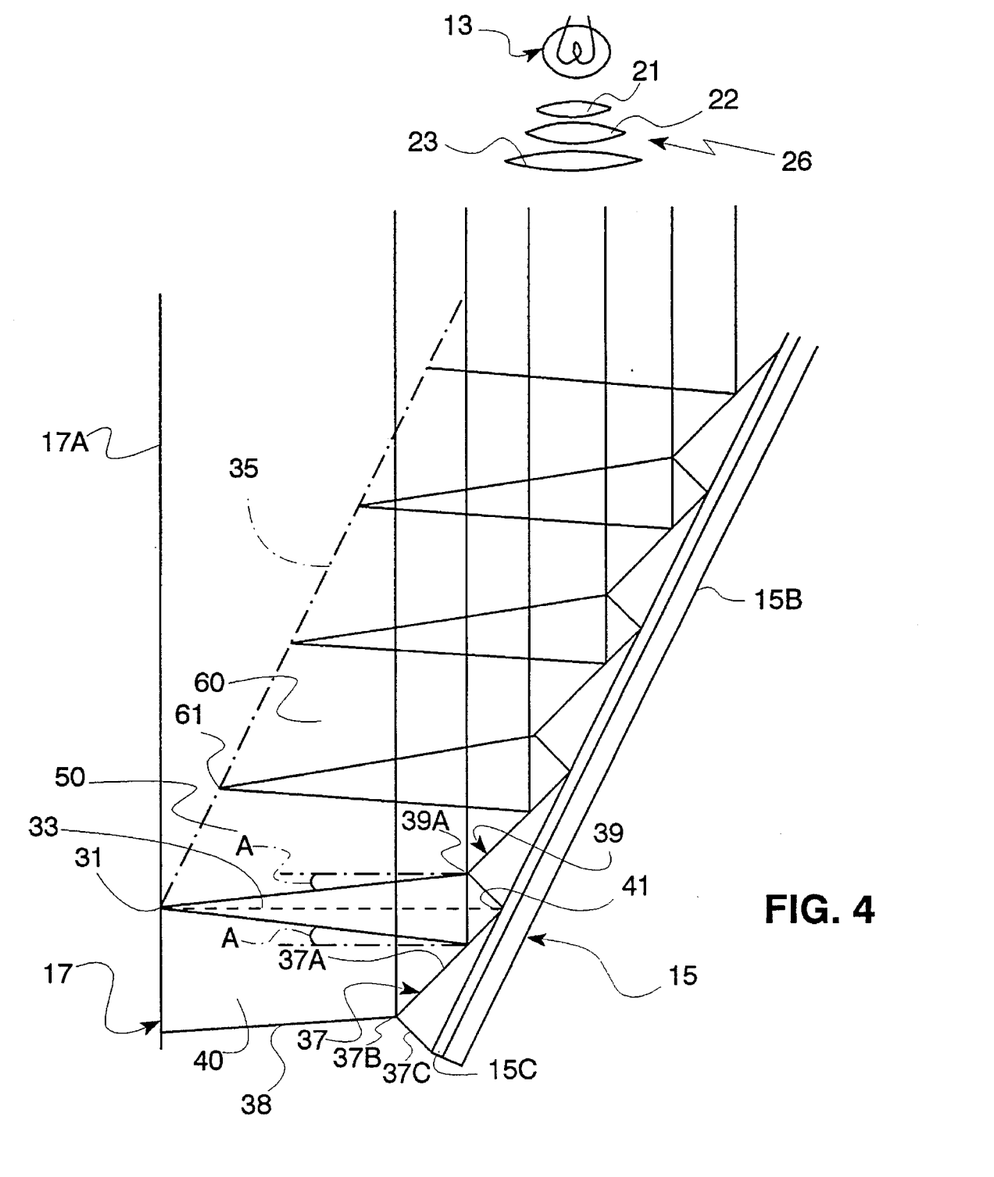
FIG. 4 is a diagrammatic view of a portion of a finely faceted mirror of the projector of FIG. 1, illustrating the principles of the present invention.

As best seen in FIG. 4, the facets, such as facets 37 and 39, are each generally triangularly shaped in cross section, and are each similar to one another. The series of triangularly shaped facets are arranged in a side-by-side arrangement to provide a sawtooth configuration. Each one of the facets, such as the facet 37, includes a sloping reflecting surface, such as the surface 37A, which is integrally joined at an external corner edge, such as the edge 37B, to a right angle surface 37C. The reflecting surface serves to reflect the light from the lamp 13 toward the mirror 17. Collimated light from the lamp 13 engages and is reflected from the angularly disposed reflecting surface, such as the surface 37A, between its corner edge 37B and an adjacent corner edge 39A of a facet 39 disposed toward the lamp 13, to help spread the light beam by separating it into separate beam segments, such as beam segments 40 and 50.

In order to fill in the dark or shadow areas between the beam segments for reducing image distortion, the mirrors 15 and 17 are sufficiently spaced apart to permit the beam segments to diverge and overlap or intersect before they impinge on the mirror 17. In this regard, spaces or gaps between the beam segments are filled in prior to impinging the closest portion of the mirror 17.

The mirrors 15 and 17 are disposed at their closest portions at their forward portions thereof, as indicated in FIG. 4 at the forward end facets 37 and 39. In this regard, according to the present invention, the mirrors 15 and 17 are positioned at their closest portions by a distance at least equal to a straight line distance indicated generally at 33, sufficient to permit the diverging beam segments 40 and 50 to overlap or converge together at a vertical line 31, before engaging the mirror 17. The straight line distance 33 extends normal to the mirror at the vertical line 31 (illustrated as a point in the plan diagrammatic view of FIG. 4), and intersects with an internal corner edge 41 joining integrally the facets 37 and 39.

The remaining beam segments overlap prior to their engagement with the mirror 17. For example, the beam segment 50 overlaps or intersects with its adjacent beam segment 60 at a vertical line 61 (shown as a point in FIG. 4). Such vertical lines 31 and 61 of intersection are disposed within a vertical plane generally indicated at 35 as a line, extending generally parallel to the plane of the back plate 15B. Thus, all of the remaining beam segments overlap or intersect at the plane 35, and thus fill in dark or shadow spaces prior to their impingement upon the mirror 17.

It should be understood that a similar relative spacing between the mirror 17 and the light impinging surface of the display panel 24 to avoid dark or shadow areas thereon. Thus, a fully illuminated display panel is achieved, and thus image distortion is eliminated or at least greatly decreased.

The faceted mirror arrangement acts to spread the light in both the X and Y directions. Light from the lamp 13 is directed in a manner perpendicular to the lens assembly 26 surface toward the first faceted mirror 15. As shown in FIG. 2, the light is spread and enlarged in the Y direction as it is reflected from the finely faceted surface of mirror 15 in a precise manner to correspond to the Y dimension of the mirror 17. The mirror 15 directs these Y direction spread apart light beam segments toward the second faceted mirror 17. As shown in FIG. 2, the second faceted mirror 17, then segments and spreads the light in the X direction corresponding to the X dimension of the mirror 17. Thus, the individual light beams diverge and intersect or slightly overlap just as they impinge on the surface of the underside of the liquid crystal display panel 24. As a result, the light generated by the lamp 13, has been adjusted precisely in the X and Y directions to provide a compact and effective configuration for the projection equipment of FIG. 1. Furthermore, since the faceted mirrors 15 and 17 are arranged in close proximity to one another, the overall configuration facilitates the construction of a very compact projector unit capable of employing a conventional lamp assembly such as assembly 11 to generate high luminosity for projection illumination purposes in a highly efficient and effective manner.

Because the light source has a finite extent, the light rays from lamp 13 are distributed over an angular range instead of traveling parallel as shown diagrammatically in FIG. 4. As a result, the spacing between the mirrors 15, 17 and the panel 24 can be adjusted so that the shadow areas between the beams are filled in before they impinge on the surface of the panel 24 (FIG. 1). This is very important, as the LCD display panel 24 is where the image is formed and the presence of the shadow areas here would otherwise cause image distortion or other undesirable results.

In order to prevent loss of light, the internal components of the projector, such as the mirrors 15 and 17, the LCD panel 24, the light source and the condenser lens assembly 26, should all be positioned as close together as possible to reduce light loss. Therefore, for the spacing shown in FIG. 4 between the two faceted mirrors 15 and 17, the closest distance is represented by the line 38.

The spreading light beams must overlap or converge together at least within the given shortest distance 38. Angle A represents the degree of light spreading. Angle A is critical, because if angle A were smaller than as indicated in FIG. 4, the two adjacent light beams 40 and 50 would not intersect at point 31 and the second mirror 17 surface, and therefore there would be a spacing or shadow area between the two adjacent light beams. Although not shown in FIG. 4, the same would be true regarding the beams reflecting from the second mirror 17 to the LCD display panel 24 in FIG. 1, when the light is reflected from the second mirror 17 onto the LCD panel 24. Therefore, in accordance with the invention, the angle A is determined such that the shadow areas are eliminated, certainly once the reflected light impinges on the LCD panel 24 of FIG. 1 to form properly the image to be projected.

For this purpose, the angle A is equal to the arc tangent of the size of the light source 13, divided by the effective focal length of the condenser lens assembly 26. This relationship is expressed as follows:

$$\text{angle of spreading} = A = \arctan\left(\frac{\text{size of light source}}{\text{effective focal length of optical element}}\right)$$

where the size of the light source is a dimension that can be determined by a measurement of a given light source, and the optical element is the lens assembly 26. Therefore, by taking the arc tangent of the size of the light source, divided by the effective focal length of the condenser lens assembly, the angle A of the spreading of the light is determined so that the angles of the plane of the mirror 15 and its facets can be adjusted to cause the light beams to overlap at least within the shortest distance 38 as indicated in FIG. 4.

Figure 5:
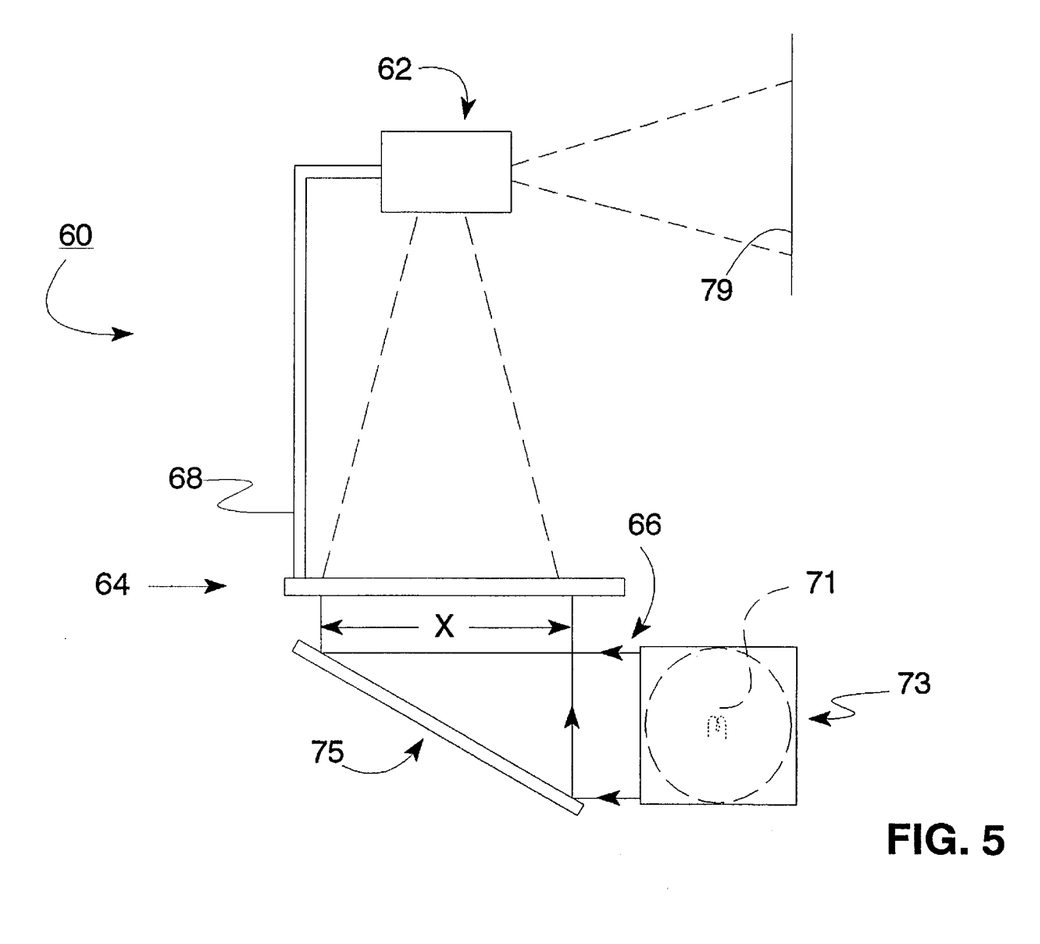
FIG. 5 is a diagrammatic view of an overhead projector, which is also constructed in accordance with the present invention.

Referring now to FIG. 5, there is shown an overhead projector 60 constructed in accordance with the present invention. The overhead projector 60 is generally similar to the apparatus of FIGS. 1–3, except that the projector 60 is adapted to project images formed by a transparency (not shown) or the like. The projector 60 includes a conventional mirror and projection lens assembly 62 mounted in place by means of a support arm 68 above an image forming display device in the form of a transparency supporting stage 64 (in place of the display panel 24 of FIG. 1). A projection illumination arrangement 66 is disposed below the stage 64.

The projection illumination arrangement 66 is generally similar to the illumination system of FIG. 1, and includes a high intensity light source 71, a collimating lens (not shown), and two angularly disposed faceted mirrors 73 and 75. The light emitted by the light source 71 is collected and directed toward the vertical faceted mirror 73 by a parabolic reflector (not shown) or a collimating lens, such as a 3-element condenser lens (not shown). The light is then reflected from the surface of the vertical faceted mirror 73 toward the backwardly inclined upwardly faceted mirror 75, and reflected therefrom vertically upwardly through the stage 64. The light is segmented and spread in the X and Y dimensions in a similar manner as described in connection with the illumination system of FIG. 1. The spacing between the mirrors 73 and 75, and between the mirror 75 and the image forming device 64 are similar to the illumination arrangement of FIG. 1.

The stage 64 is positioned between the projector illumination arrangement 66 and the projection lens assembly 62. The stage 64 aids in forming a desired image by supporting from below transparencies (not shown), separate liquid crystal display panels (not shown), or the like.

Figure 6:
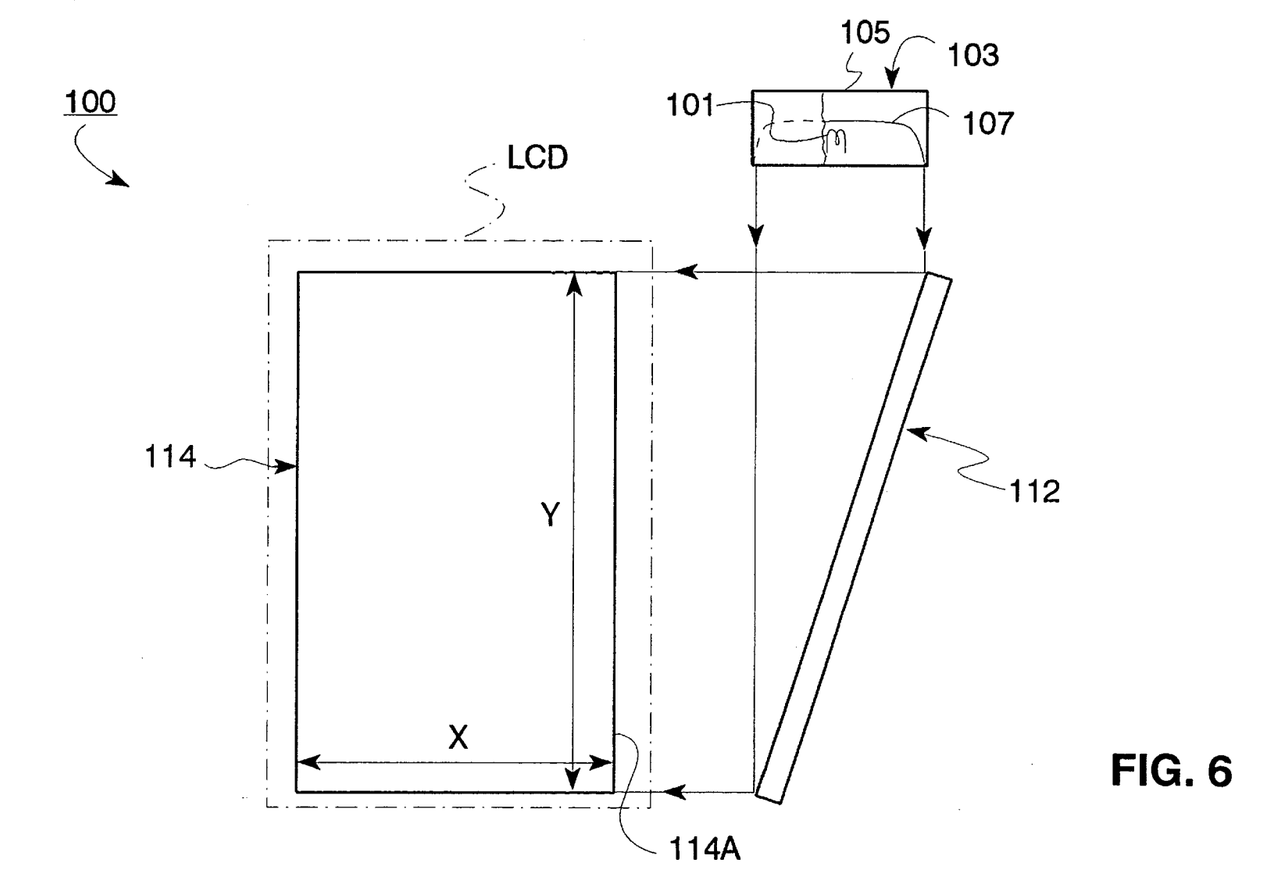
FIG. 6 is a top plan diagrammatic view of an integrated projector, which is constructed in accordance with the present invention.

Referring now to FIG. 6, there is shown another form of an overhead projector 100, constructed in accordance with the present invention. The overhead projector 100 is generally similar to the apparatus of FIGS. 1–3, except that the lamp assembly 103 includes a high intensity lamp 101 having a parabolic reflector 107 instead of a condenser lens assembly.

Considering now the lamp assembly 103 in greater detail with reference to FIG. 6, the lamp assembly generally includes a lamp housing unit 105 which is mounted at the rear portion of the projector housing (not shown). The lamp housing unit 105 includes a high intensity lamp 101 and a parabolic reflector 107 disposed therebehind, which directs the light generated thereby toward the first faceted mirror 112. It should be understood that other types and kinds of lamps may also be employed. The parabolic reflector 107 acts to collect and to redirect forwardly the light emitted by the high intensity lamp 101 in such a way that substantially all light beams are generally parallel. In this regard, as indicated in FIG. 6, substantially all light rays generated by the lamp 101 travel in a substantially parallel manner to the faceted mirror 112, without the use of a condenser lens.

However, as previously described in connection with the apparatus of FIG. 4, the light beam directed from the parabolic reflector 107 also spreads angularly outwardly, and therefore, is not precisely parallel as a practical matter.

As described in connection with the drawing of FIG. 4, the angle of spreading of the light beam must be adjusted in order to eliminate shadow areas between adjacent light beams being reflected from the faceted mirror 112 and 114 surfaces for the closest spacing between the mirror, and between the second mirror and the LCD panel. It has been determined for the projector 100 that the angle of spreading is equal to:

angle of spreading =

$$\arctan\left(\frac{\text{size of light source}}{\text{effective focal length of parabolic reflector}}\right)$$

In this regard, when a parabolic reflector is used, the spacing or shadow areas between adjacent light beams can be substantially eliminated by adjusting the size of the light source or effective focal length of the parabolic reflector appropriately. Since there is some known aberration that occurs when a parabolic reflector is employed, a condenser lens assembly is preferred. Therefore, it is preferred to use the condenser lens arrangement 26 as described in the projector of FIGS. 1, 2 and 3.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A method of projecting an image onto a remote viewing surface, comprising:

positioning a projection lens system in an optical path extending from a source of high intensity projection light to the remote viewing surface;

positioning an image forming device generally horizontally in a low profile housing and substantially in said optical path to enable light from said source of high intensity light to be modulated;

positioning an optical system in said low profile housing substantially below said image forming device for directing light from said source of light through said device;

positioning a lamp assembly at a rear portion of said housing to provide said source of high intensity projection light; and coupling a display control system electrically to said device for modulating the high intensity projection light as it passes through said device to form the image for projection purposes;

generating a generally collimated light for image projection purposes;

wherein said step of positioning said optical system includes positioning a first faceted mirror at a predetermined angle relative to the collimated light to produce beam segments reflecting therefrom for spreading them by a predetermined amount in a desired dimension; and positioning a second faceted mirror at a predetermined angle relative to the first mirror to reflect said beam segments therefrom and to in turn produce beam segments reflecting therefrom for spreading them by a predetermined amount in another desired dimension.

2. A method according to claim 1, wherein the steps of positioning the mirrors is at a predetermined distance of a sufficient length to permit the beam segments reflecting from the first mirror to diverge and intersect to fill in dark areas therebetween before impinging on the second mirror.

3. A method of projection according to claim 1, wherein the step of positioning said image forming device includes:

positioning said image forming device at a predetermined angle relative to the second mirror and at a predetermined distance therefrom of a sufficient length to permit the beam segments reflecting from the second mirror to diverge and intersect to fill in dark areas before impinging on the image forming device;

whereby the light is uniformly dispersed over the light impinging surface of the image forming device to reduce distortion and efficiently and effectively form an image to be projected.

4. A method of projecting an image onto a remote viewing surface, comprising:

positioning a projection lens system in an optical path extending from a source of high intensity projection light to the remote viewing surface;

positioning an image forming device generally horizontally in a low profile housing and substantially in said optical path to enable light from said source of high intensity light to be modulated;

positioning an optical system in said low profile housing substantially below said image forming device for directing light from said source of light through said device;

positioning a lamp assembly at a rear portion of said housing to provide said source of high intensity projection light; and coupling a display control system electrically to said device for modulating the high intensity projection light as it passes through said device to form the image for projection purposes;

generating a generally collimated light for image projection purposes;

wherein the generating of the generally collimated light includes positioning an optical device relative to said source of light for causing the generally collimated light to be directed therefrom where the light spreads at an angle of spreading equal to the arc tangent of the size of the light source divided by the effective focal length of the device to cause the generally collimated light to overlap within a predetermined distance.

5. A projection illumination arrangement for projecting an image onto a remote viewing surface, comprising:

a projection lens arrangement;

means for positioning said projection lens arrangement in an optical path extending from a source of high intensity projection light to the remote viewing surface;

an image forming device;

means for positioning said image forming device generally horizontally in a low profile housing and substantially in said optical path to enable light from said source of high intensity light to be modulated;

an optical system;

means for positioning said optical system in said low profile housing substantially below said device for directing light from said source of light through said device;

a lamp assembly;

means for positioning said lamp assembly at a rear portion of said housing to provide said source of high intensity projection light;

a display control system; and means for coupling said display control system electrically to said image forming device to facilitate modulating the high intensity projection light as it passes through said device to form the image;

wherein said means for positioning a lamp assembly includes means for collimating the light from said source of light for image projection purposes; and wherein said means for positioning an optical system includes:

a first faceted mirror;

means for positioning said first faceted mirror at a predetermined angle relative to the collimated light to produce beam segments reflecting therefrom for spreading them by a predetermined amount in a desired dimension;

a second faceted mirror;

means for positioning said second faceted mirror at a predetermined angle relative to the first mirror to reflect said beam segments therefrom and to in turn produce beam segments reflecting therefrom for spreading them by a predetermined amount in another desired dimension;

said mirrors being positioned at a predetermined distance of a sufficient length to permit the beam segments reflecting from the first mirror to diverge and intersect to fill in dark areas therebetween before impinging on the second mirror.

6. A projection illumination arrangement according to claim 5, wherein said means for positioning said image forming device includes:

means for positioning said image forming device at a predetermined angle relative to the second mirror and at a predetermined distance therefrom of a sufficient length to permit the beam segments reflecting from the second mirror to diverge and intersect to fill in dark areas before impinging on the image forming device;

whereby the light is uniformly dispersed over the light impinging surface of the image forming device to reduce distortion and efficiently and effectively form an image to be projected.

7. A projection illumination arrangement according to claim 5, wherein the image forming device is an image modulating device.

8. A projection illumination arrangement according to claim 5, wherein said image forming device is a transparency supporting stage.

9. A projection illumination arrangement according to claim 5, wherein said lamp assembly includes a parabolic reflector to collect and direct substantially all of the light emitted by said source of light toward said a first faceted mirror.

10. A projection illumination arrangement for projecting an image onto a remote viewing surface, comprising:

a low profile housing;

light collimating means disposed at a rear portion of said housing for producing high intensity collimated light;

first dimension faceted mirror means mounted within said housing at a predetermined angle relative to said light collimating means for spreading reflectively the collimated light by a predetermined amount in a desired dimension to form a plurality of high intensity light beams;

second dimension faceted mirror means mounted within said housing at a predetermined angle relative to the first mirror means for spreading reflectively said plurality of high intensity light beams by another predetermined amount in another desired dimension to cause a substantial portion of said plurality of high intensity light beams to be directed in a desired direction along an optical path;

image forming means mounted substantially horizontally within said housing in said optical path to enable the light directed in said desired direction to be modulated; and means for coupling a display control system electrically to said image forming means for enabling it to modulate said plurality of high intensity light beams to form the image.

* * * * *